Sept. 12, 1939.     E. BECKER     2,172,827
QUICK CONNECTION FOR CONSTRUCTIONAL ELEMENTS
Filed May 22, 1937
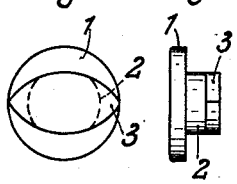
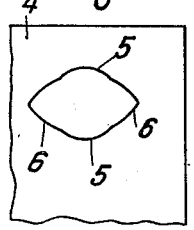
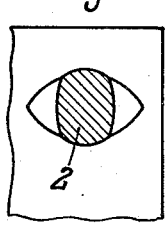
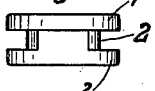
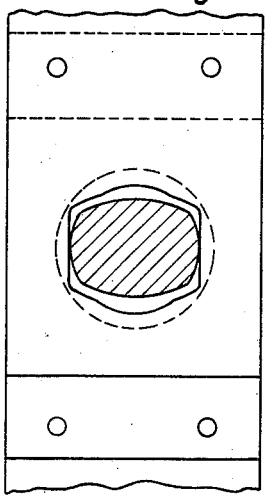
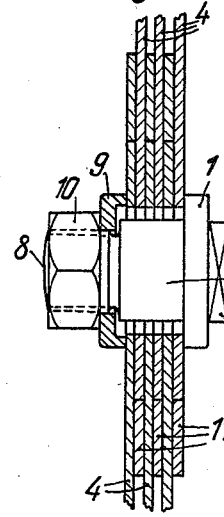
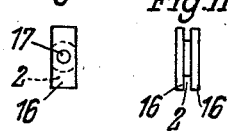
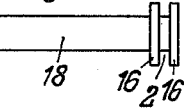
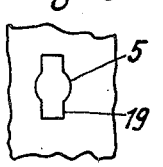
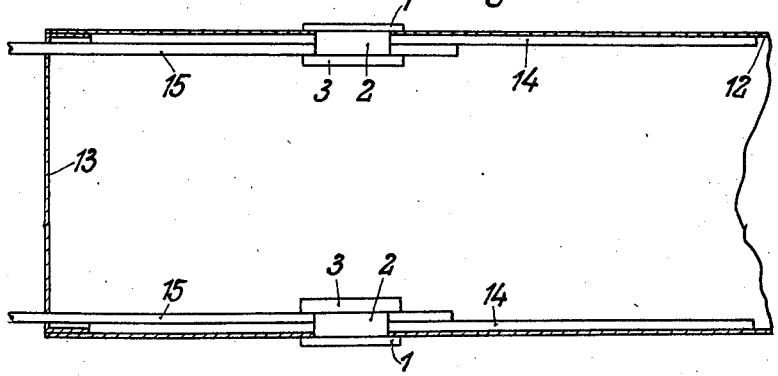
Emil Becker
Inventor:
By (signature)
his Atty.

Patented Sept. 12, 1939

2,172,827

UNITED STATES PATENT OFFICE 2,172,827

QUICK CONNECTION FOR CONSTRUCTIONAL ELEMENTS

Emil Becker, Munich, Germany

Application May 22, 1937, Serial No. 144,207
In Germany July 18, 1934

7 Claims. (Cl. 85—5)

My invention relates to a quick connection for constructional elements by means of threadless tightening bolts.

One object of my invention is to provide a connection in which a tightening bolt is passed through aligned orifices in the constructional elements to be connected and all the elements traversed by the bolt are locked together by rotating the bolt about its axis.

Another object of my invention is to provide a quick connection of this type in which the orifices in the constructional elements are covered by suitable flanges on the ends of the tightening bolt.

Still another object of my invention is to provide a quick connection to be established by rotating a threadless tightening bolt extending through aligned orifices in the constructional elements to be connected, in which flanges on the outer ends of the tightening bolt may be locked against the outermost of the constructional elements.

Other objects of the invention will appear from the following detailed description and from the appended claims.

My invention is illustratively exemplified in the accompanying drawing, in which:

Figs. 1, 2 and 3 are plan, end and side views, respectively, of one form of short tightening bolt, Fig. 4 is a plan view of a metal plate fitting said bolt, Fig. 5 is a cross-section of an assembled bolt and plate taken through the bolt shank, Fig. 6 is an end view of assembled plates and bolt, Fig. 7 is a cross-section of an assembly of plates and a modified form of bolt taken through the bolt shank, Fig. 8 is a section taken at right angles to Fig. 7, Fig. 9 is a section of a hollow wall plate embodying bolts as illustrated in Figs. 1 to 3, Figs. 10 and 11 are plan and side views, respectively, of a modified form of bolt with a rectangular head, Fig. 12 is a side view of a modified form of bolt with an intermediate distance piece, and Fig. 13 is a plan view illustrating a metal plate orificed for bolts according to Figs. 10, 11 and 12.

According to Figs. 1, 2 and 3, a tightening bolt consists of a circular flange 1, a shank 2 and a two-pointed flange 3. The shank 2 is cylindrical over alternate quadrants of its circumference, and the intermediate portions are flattened relative to the cylindrical cross-section by a milling or turning operation which may also serve to produce the two-pointed flange. The cross-section of the finished shank corresponds substantially to a flattened circle.

According to Fig. 4, the metal plates 4 to be connected by the bolts 1, 2, 3 are provided with orifices 5 of elongated shape having a smaller diameter exceeding the minor axis and being less than the major axis of said flattened circle and a larger diameter exceeding the major circle axis. Recesses 6 are provided at the ends of the major diameter of the orifices 5 of a size to allow the passage of the two-pointed flange 3 with a little play.

According to Figs. 5 and 6, after the two-pointed flange 3 has been passed through the orifices 5 of all the plates 4 to be connected and has brought all said orifices 5 in exact alignment, all the plates 4 traversed by the shank 2 of the bolt member are locked together by rotating the bolt about 90° until the major axis of its shank cross-section corresponds to the smaller diameter of the orifices 5, whereby a powerful jamming effect and a rigid connection between the individual elements are obtained. At the same time, the flanges 1 and 3 of the bolt overlie the outer walls of the outermost plates 4 adjacent the orifices whereby the plates are held together without any buckling or crumpling of the sheet metal.

The connection according to Figs. 7 and 8 is essentially similar to that of Figs. 5 and 6, but in Figs. 7 and 8, the shank carries on one of its flanges 1 a rectangular head 7 adapted to be gripped by a wrench and to facilitate rotation of a bolt passing through many metal plates. The other end of the bolt terminates in a threaded portion 8. A washer 9 forming the second bolt flange may be pressed against the outermost plate 4 by means of a nut 10, thus tightening the connection in axial direction. Metal plates connected in this manner can be subjected to considerable stresses adjacent their bolt holes.

Whilst the connection according to Figs. 5 and 6 is closed on one side only, the orifice 5 remaining visible from the other side, in the connection according to Figs. 7 and 8, the orifice is completely closed on both sides thereof.

In the embodiment of the invention illustrated in Figs. 7 and 8, supplementary sheet metal strips 11 are secured to the plates 11 of the two plate assemblies to be connected. The strips 11 form not only distance pieces between the individual plates of each assembly, but serve in addition as abutments to align the orifices of the two assemblies, when the free ends of the corresponding plates are brought into engagement with one another. Moreover, the strips 11 prevent the connected combination from rattling.

Fig. 9 shows a hollow wall-plate formed of sheet-metal side-plates 12 and a frame 13 of U-shaped cross-section. In order to lock two such plates together, each of them is provided with stiffening insertions 14, which are provided with orifices of the kind described for bolts 1, 2, 3, for example according to Figs. 1–3. Connecting ties 15 are insertable through slots in the edge frames 13 and are provided at both ends with orifices of the kind described, so that they can be secured to the plates 12 and stiffeners 14 by means of bolts 1, 2, 3.

According to Figs. 10 and 11 both flanges of the bolt are formed as rectangular flanges 16. A longitudinal bore 17 permits of employing this bolt simultaneously as a bearing for additional threaded bolts which may serve to press the flanges 16 towards one another or to hold a plurality of bolts 2, 16 together, if desired with inserted distance pieces.

According to Fig. 12 a pair of bolts 2, 16 is made in one piece with an intermediate bolt part 18, whereby two parallel pairs of wall pieces can be locked together, one pair of which is spaced a considerable distance from the other.

According to Fig. 13 the plate members 4 have their orifices 5 widened to apertures 19 of a shape corresponding to that of the flanges 16. These apertures cooperate with the bolts according to Figs. 10, 12 exactly as is described by way of example with reference to Figs. 1–6.

I claim:

1. A quick connection for constructional elements, comprising in combination a plurality of juxtaposed sheet elements provided with orifices in registration, and a threadless bolt having a shank with a cross-section corresponding substantially to a flattened circle, said shank being adapted to be passed through and rotated in said orifices, the latter being of elongated shape with their smallest diameters exceeding the minor axis and being slightly less than the major axis of said flattened circle and their largest diameters exceeding the major circle axis.

2. A quick connection, as claimed in claim 1, in which said bolt comprises holding flange-lugs at both ends of said shank.

3. A quick connection, as claimed in claim 1, in which said bolt comprises a holding flange-lug of elongated shape adapted to be passed through said orifices, said flange-lug having a smaller diameter coinciding with the minor axis of said flattened circle and a larger diameter exceeding the major circle axis, said orifices being formed with a larger diameter exceeding the larger diameter of said flange-lug.

4. A quick connection, as claimed in claim 1, in which said bolt comprises a holding flange-lug of elongated shape adapted to be passed through said orifices, said flange-lug having a smaller diameter coinciding with the minor axis of said flattened circle and a larger diameter exceeding the major circle axis, said orifices having a shape similar to that of the lug and a size slightly exceeding that of the latter, whereby said flange-lug passing through the orifices effects an exact alignment thereof.

5. A quick connection, as claimed in claim 1, in which the larger diameter of said orifices exceeds the major axis of said flattened circle only slightly, so as to provide for an exact alignment of the orifices by means of said shank being passed therethrough.

6. A quick connection, as claimed in claim 1, wherein said bolt is provided with an axial bore.

7. A quick connection, as claimed in claim 1, wherein said bolt is hollow and constructed as a bearing.

EMIL BECKER.